United States Patent
Warnecke

[19]
[11] Patent Number: 6,115,967
[45] Date of Patent: *Sep. 12, 2000

[54] MOTOR VEHICLE SEALING ARRANGEMENT

[75] Inventor: Hans-Jürgen Warnecke, Goslar, Germany

[73] Assignee: Meteor Gummiwerke K.H. Bädje GmbH, Bockenem, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/043,928

[22] PCT Filed: Sep. 21, 1996

[86] PCT No.: PCT/EP96/04139

§ 371 Date: Mar. 30, 1998

§ 102(e) Date: Mar. 30, 1998

[87] PCT Pub. No.: WO97/12775

PCT Pub. Date: Apr. 10, 1997

[30] Foreign Application Priority Data

Sep. 30, 1995 [DE] Germany ................. 295 15 597 U

[51] Int. Cl.[7] .................. B60J 1/16; E05F 11/38; E06B 7/16
[52] U.S. Cl. .................. 49/377; 49/374; 49/495.1
[58] Field of Search .................. 49/377, 440, 441, 49/374, 499.1, 493.1, 495.1

[56] References Cited

U.S. PATENT DOCUMENTS

| | | | |
|---|---|---|---|
| 4,442,156 | 4/1984 | Yamaguchi | 428/142 |
| 4,897,298 | 1/1990 | Otawa et al. | 428/122 |
| 5,265,377 | 11/1993 | Iwasa et al. | 49/441 |
| 5,343,655 | 9/1994 | Miyakawa et al. | 49/377 X |

FOREIGN PATENT DOCUMENTS

| | | | |
|---|---|---|---|
| 0 021 989 | 1/1981 | European Pat. Off. | B60R 13/06 |
| 0 193 133 | 9/1986 | European Pat. Off. | B60R 13/06 |
| 0 627 341 | 12/1994 | European Pat. Off. | B60R 13/06 |
| 33 35 150 | 7/1984 | Germany | B05D 5/02 |
| 34 05 973 | 8/1985 | Germany | B29C 67/12 |
| 34 42 653 | 6/1986 | Germany | B60J 7/195 |
| 35 06 410 | 8/1986 | Germany | B29D 22/00 |
| 42 02 475 | 7/1992 | Germany | B60J 10/04 |
| 43 10 754 | 10/1994 | Germany | C09K 3/10 |

*Primary Examiner*—Daniel P. Stodola
*Assistant Examiner*—Hugh B. Thompson
*Attorney, Agent, or Firm*—Synnestvedt & Lechner LLP

[57] ABSTRACT

A window glass (3) is moveable relative to a motor vehicle door. A sealing arrangement (4) comprises on each side of the window glass (3) a sealing groove (9, 10) which is provided with a cover strip (12) of a thermoplastic plastics material in its regions which come into sliding contact with the window glass (3). The cover strip (12) is provided at least on its side facing the window glass (3) with a grooving which reduces or prevents squeaking noises.

23 Claims, 7 Drawing Sheets

MOTOR VEHICLE SEALING ARRANGEMENT

BACKGROUND

The invention relates to a sealing arrangement and more particularly to seals for sealing openings in motor vehicles such as window glass openings, doors, and sun roofs.

In one known sealing arrangement of this type (Patent Document EP 0 193 133 A2) indentations are part of a pattern of roughness of microscopic size produced for example by sandblasting.

From U.S. Pat. No. 5,265,377 it is known per se to fix a strip of thermoplastic material on the base of a window sealing profile. The strip is provided with alternating ridges and furrows on a side which faces the window, with these ridges and furrows extending parallel to one another and at an angle to the longitudinal direction of the strip. The distance between adjacent ridges is so large that dirt or dust particles in the furrows can be conducted along into lateral gutters of the profile. This profile should thus have, above all, self-cleaning properties and protect the window from being scratched.

From EP 0 627 341 A1 it is known per se to provide a plastics profile which has a slide overlay on its sealing side. The slide overlay comprises at least one coextruded sealing rib extending in the longitudinal direction of the profile. Each sealing rib consists of thermoplastic material which is harder than that of the plastics material of the profile.

In other known sealing arrangements (DE 34 05 973 A1 and DE 35 06 410 A1) a cover strip serves to reduce the friction between a window glass and the sealing arrangement and thus to increase the relative slideability. The side of the cover strip facing the window glass is flat and smooth.

It is also known to sinter a polyamide powder onto the sealing profile to increase the slideability, and thereby to produce a molten-smooth, especially low-friction outer surface of a cover strip.

Furthermore, it is known to mount on the sealing profile a cover strip having flocking, in order to brush off moisture and foreign bodies from a window glass.

Particularly in the case of frameless window glass, such as one finds used in coupés or convertibles, these known types of cover strip have led however to inadequacies. Above all, under certain operating conditions, chiefly with wet window glass, squeaking or rumbling noises occur if the window glass is moved relative to the sealing arrangement. Annoying noises occur in particular with the ever increasing powered movement of the window glass.

Rattling and/or squeaking noises also occur if on the one hand, in the case of a closed door of a motor vehicle, relative movements occur between the door and the body, and if on the other hand a roof member, in particular a pop-up/sliding sunroof or a moon roof, of a motor vehicle is opened or closed.

The object of the invention is to reduce or even eliminate entirely noises which can arise through the movement of the window glass relative to the sealing arrangement or of other closable components of the motor vehicle relative to the associated opening in the vehicle body.

SUMMARY OF THE INVENTION

The objects of the present invention are achieved by a seal as described herein for sealing a closure member such as a window glass, door, or sunroof with respect to an aperture in the body of a motor vehicle. Such apertures in motor vehicles include window openings in vehicle doors, the door opening, and sunroof openings in the vehicle roof. The seal sealingly contacts a surface to close the aperture. The seal has a sealing profile, a cover strip fixed on the sealing profile, and grooves on the cover strip. The cover strip is arranged on a region of the sealing profile to face the surface against which the seal contacts to close the aperture.

The grooves effectively suppress noise, and prevents the generation of vibrations in the window glass and sealing arrangement system in the event of a movement of the window glass, these being vibrations which lead to noises, particularly squeaking and rumbling noises. It is believed that such noises are created from a constant alternation between static friction and sliding friction (slip-stick effect). By means of the grooves, uniform and constant friction properties are created between the window glass and the sealing arrangement or between the closable component and the body opening under all operating conditions. This leads to significant reduction, and even complete elimination, of noises, particularly squeaking and rumbling noises arising from the window glass movements, under all practical temperature and moisture conditions.

In the case of a roof element as the closable component, undesirable noises between the roof element and the associated opening in the roof of the motor vehicle occur to a lesser degree when the roof element is closed than when the roof element is being opened or is open in particular settings. In the case of the latter settings, there are settings in which the sealing profile is still in contact with the sealing surface. Even in these cases, the noises, particularly squeaking and rattling noises, are effectively reduced or even eliminated. The roof element can consist of enameled sheet metal, or glass, or of glass coated at the edge with plastics material, for example polyurethane. The cover strip preferably consists essentially of high molecular weight polyethylene. The grooves in the cover strip can be manufactured simply and in a well controlled manner. The high molecular weight polyethylene results in an effective noise suppression. The polyethylene is preferably peeled and can be employed for example as a cover strip having a thickness of 0.2 mm.

The grooves can be arranged spaced from one another in their direction of alignment. Here, for example, the grooves can be from several mm up to several cm in length. The direction and arrangement of the grooves are preferably chosen to be the optimum for the particular prevailing operating conditions.

The cover strip can further include fibers made from the same material as the cover strip. The fibers can be created for example during the manufacture of the grooves from that material which is removed in the grooving of the grooves. The fibers can be, for example, several mm long and very thin and fine.

These and further features and advantages of the invention will be described in more detail hereinafter in relation to embodiments of the invention which are given by way of example and which are illustrated in the drawings.

DETAILED DESCRIPTION

Figure 1:
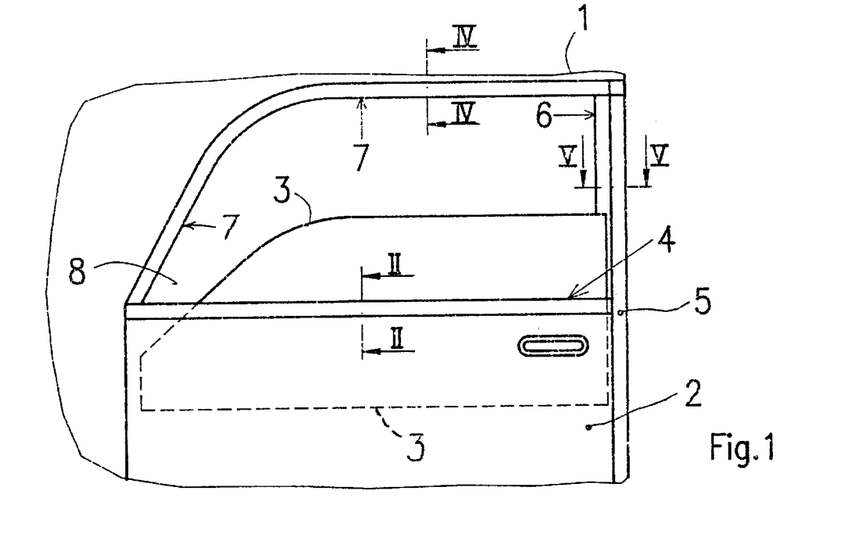
FIG. 1 is a schematic external view of a door of a coupé.

In FIG. 1 are shown a doorframe 1 and a door 2 of a coupe. A frameless window glass 3 is arranged in the door 2 in a window slot and can be raised and lowered by manual or powered means in a manner known per se. The sealing of the window slot is effected by a sealing arrangement 4 which is mounted at the upper edge of the door 2. Along the B-pillar 5 of the coupé, with the door 2 closed, the at least partially raised window glass 3 is sealed by a sealing arrangement 6. When, with the door closed, the window glass 3 is fully raised, a sealing arrangement 7 along the upper margin of the doorframe 1 in FIG. 1 and which extends at the left-hand side downwards into the so-called mirror triangle 8 provides for the necessary sealing and holding of the window glass 3.

Figure 2:
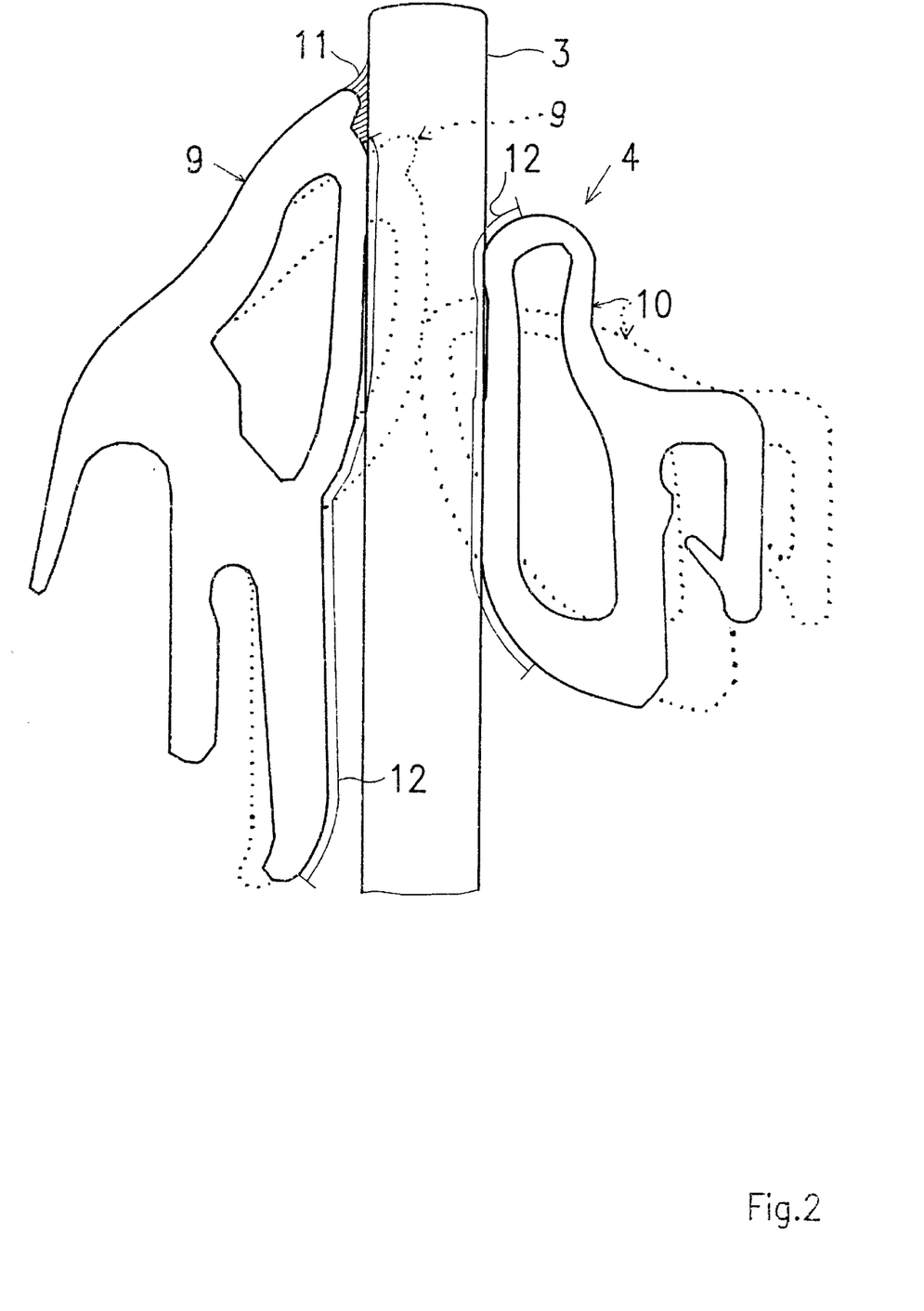
FIG. 2 is the sectional view taken along the line II—II in FIG. 1, on an enlarged scale.

FIG. 2 makes it clear that the sealing arrangement 4 comprises a sealing profile-9 and 10 on each side of the window glass 3. The sealing profiles 9, 10 consist of per se known, suitable elastomers and are secured to the door likewise in a manner known per se.

The sealing profile 9 which lies on the outside of the door 2 (FIG. 1) is provided at the top with a flocking 11 which is known per se and, extending downwards from the flocking 11, with a cover strip 12. The cover strip 12 is for example only 0.2 mm thick and therefore in FIG. 2 is shown only schematically and is shown with exaggerated thickness. The cover strip 12 adheres fixedly to the sealing profile 9 and is provided on its side facing the window glass 3 with a profiling 13 of grooves 32 (FIGS. 6 to 8).

Figure 6:
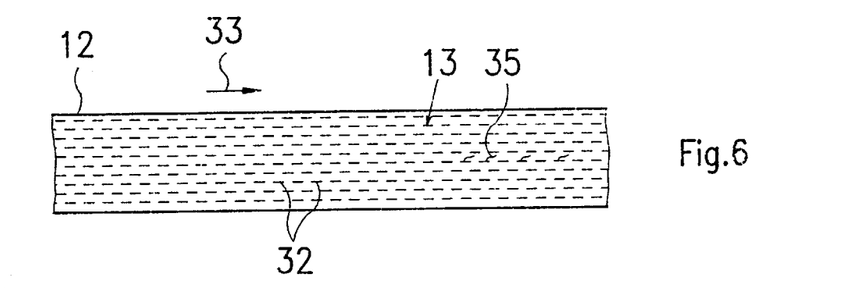
FIGS. 6 to 8 are plan views of a cover strip with respective differently orientated grooves.
Figure 7:
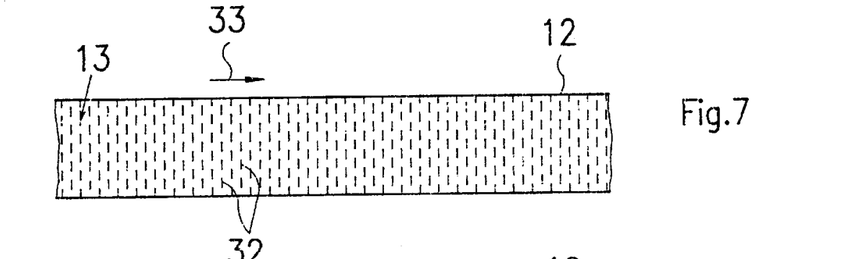
Figure 8:
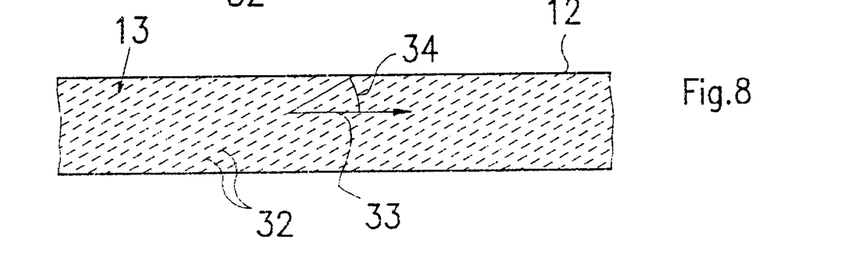

The sealing profile 10 likewise carries a cover strip 12 on the window glass side, this strip being provided on its side facing the window glass 3 with grooves 32 (FIGS. 6 to 8).

FIG. 2 shows the situation in which the window glass 3 has been raised upwards to above the sealing arrangement 4, i.e. exerting maximum contact pressure against the sealing profiles 9, 10. Additionally, in FIG. 2, the sealing profiles 9, 10 are shown by broken lines in their completely relaxed initial positions.

Figure 3:
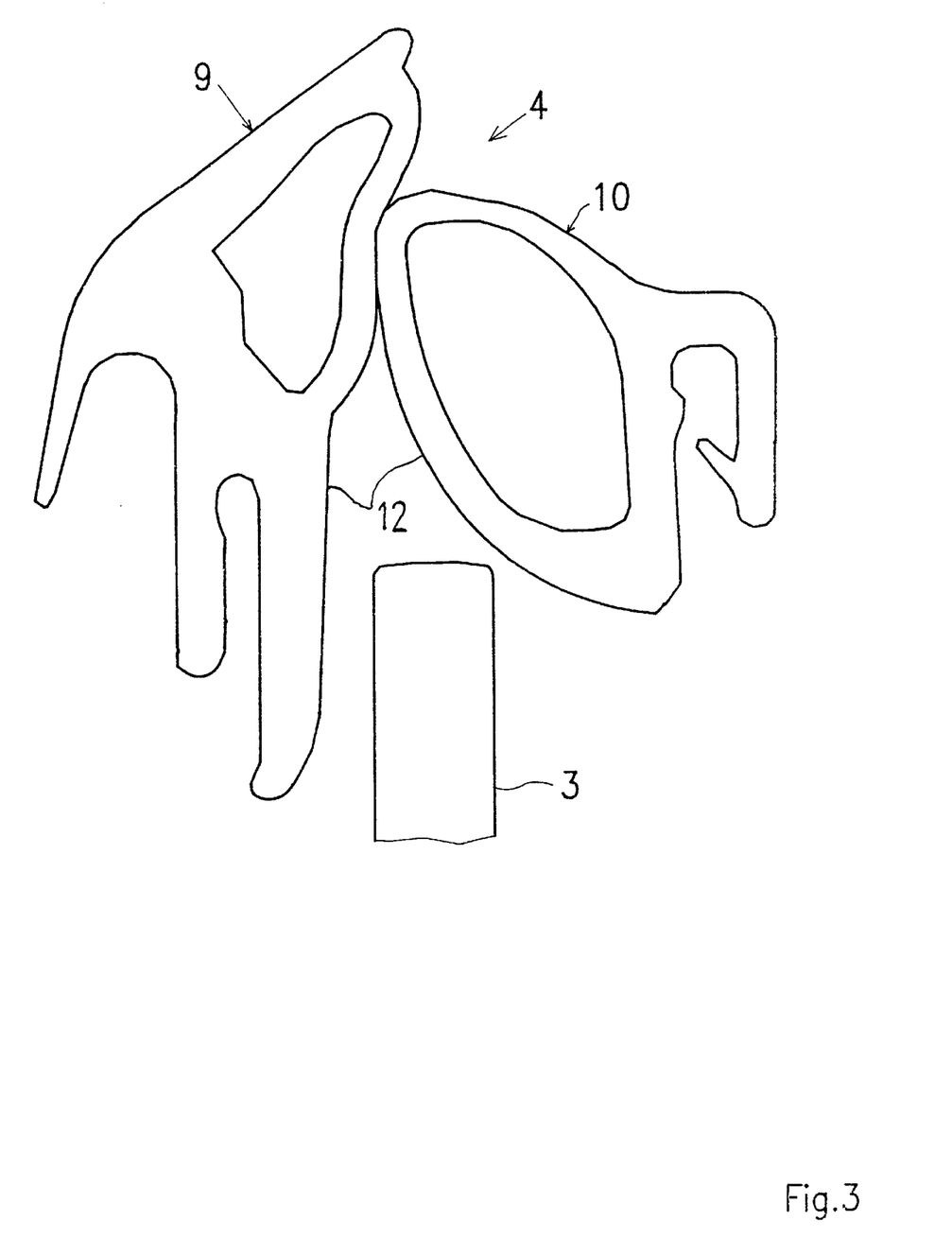
FIG. 3 is the sectional view according to FIG. 2 with the window glass lowered.

FIG. 3 illustrates that operational state of the sealing arrangement 4 in which the window glass 3 has been lowered below the sealing arrangement 4. In this condition, the sealing profiles 9, 10 are in contact with one another under a certain stress. The stress is sufficient to seal off the window slot of the door 2 (FIG. 1) when the window glass 3 has been lowered below the sealing arrangement 4.

Figure 4:
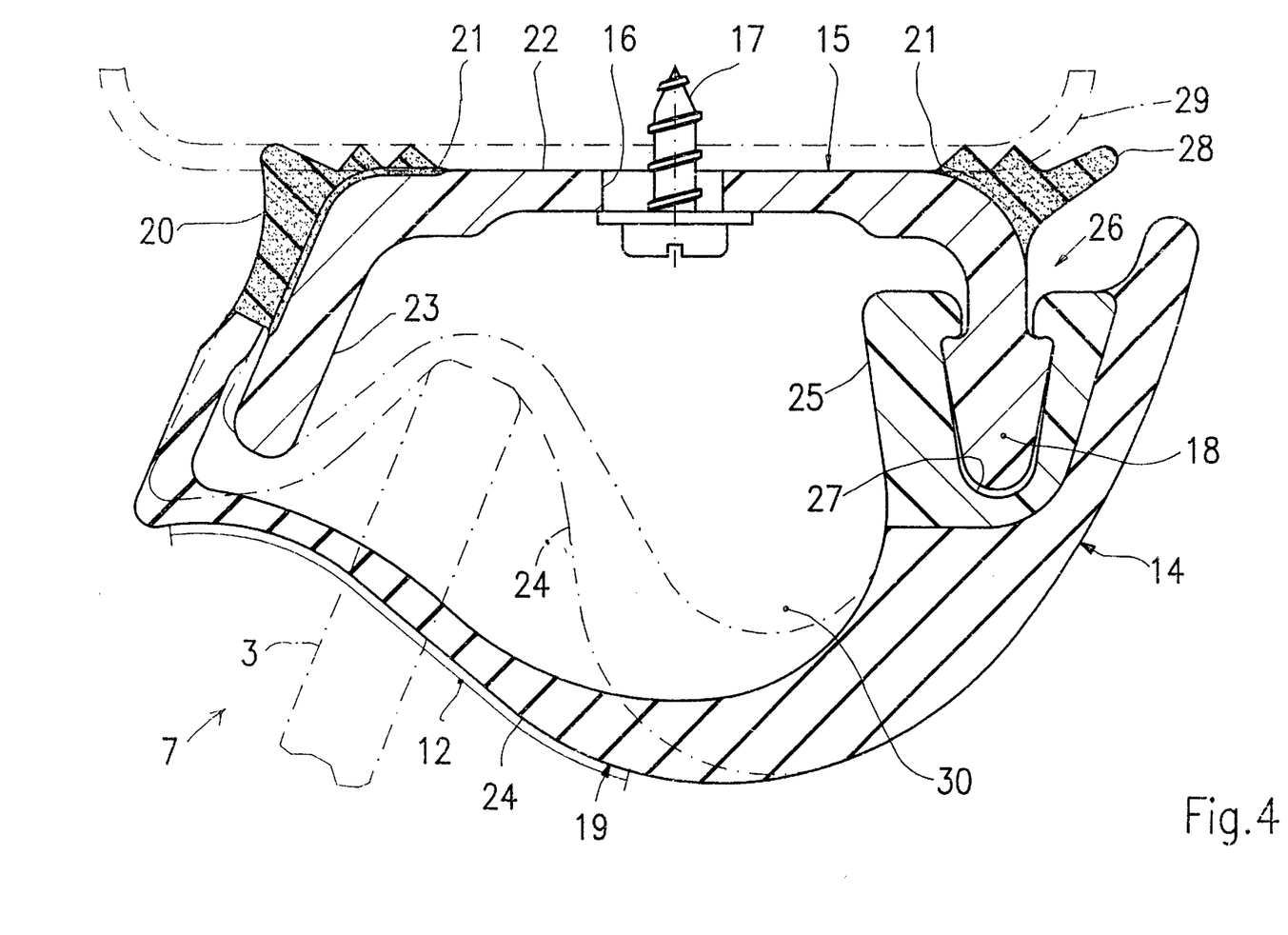
FIG. 4 is the sectional view taken along the line IV—IV in FIG. 1, on an enlarged scale.

FIG. 4 illustrates details of the sealing arrangement 7. One is concerned here with a compound profile 14 which comprises a profile strip 15 of thermoplastics material formed essentially with a U-shaped cross-sectional surface area. The profile strip 15 is provided with a plurality of mounting holes 16 arranged spaced from one another in the lengthwise direction, with these holes being arranged each to receive a sheet-metal screw 17 with play all round. Thus, the compound profile 14 can be displaced within limits relative to the screws 17 in both longitudinal and transverse directions upon being-fitted, until the optimum position of the compound profile 14 is achieved. Then, the sheet-metal screws 17 are tightened.

One lengthwise side of the profile strip 15 is formed as a first coupling member 18. A masking profile strip 19 is vulcanized to the profile strip 15 along its lengthwise side which lies opposite the first coupling member 18. The masking profile strip 19 comprises an additional profile strip 20 of foam rubber which is vulcanized to a base 22 and to a limb 23 of the profile strip 15 by means of a coupling material 21. A component of the masking profile strip 19 is a further profile strip 24 of soft rubber which overlies the profile strip 15 and which is vulcanized to the additional profile strip 20 along one lengthwise side and to a coupling profile strip 25 at its other lengthwise side. The coupling profile strip 25 consists of a thermoplastic plastics material and comprises a second coupling member 27 which forms a snap closure 26 with the first coupling member 18. On the side of the profile strip 15 which lies opposite the additional profile strip 20 is vulcanized a sealing profile strip 28 of foam rubber by means of the coupling material 21.

In FIG. 4 is shown in chain-dotted lines, at the top, a body panel 29 to which the compound profile 14 is to be mounted. For this, the toothed parts of the profile strips 20, 28 are pressed sealingly against the body panel 29 and are correspondingly deformed. Up until the aforesaid tightening of the sheet-metal screws 17, the snap closure 26 is open and the further profile strip 24 is folded downwards out of the path of the screwdriver. After the tightening of the sheet-metal screws 17, the further profile strip 24 with the coupling profile strip 25 is folded upwards and the snap closure 26 is closed. This creates a hollow chamber 30 into which the window glass 3 can deform the further profile strip 24 when the window glass 3 is raised, as is indicated by chain-dotted lines in FIG. 4.

The further profile strip 24 is provided on its region which comes into sliding contact with the window glass 3 with a cover strip 12 which again is shown exaggerated in thickness. This cover strip 12 is provided on its side facing the window glass 3 with the grooves 32 (FIGS. 6 to 8).

Figure 5:
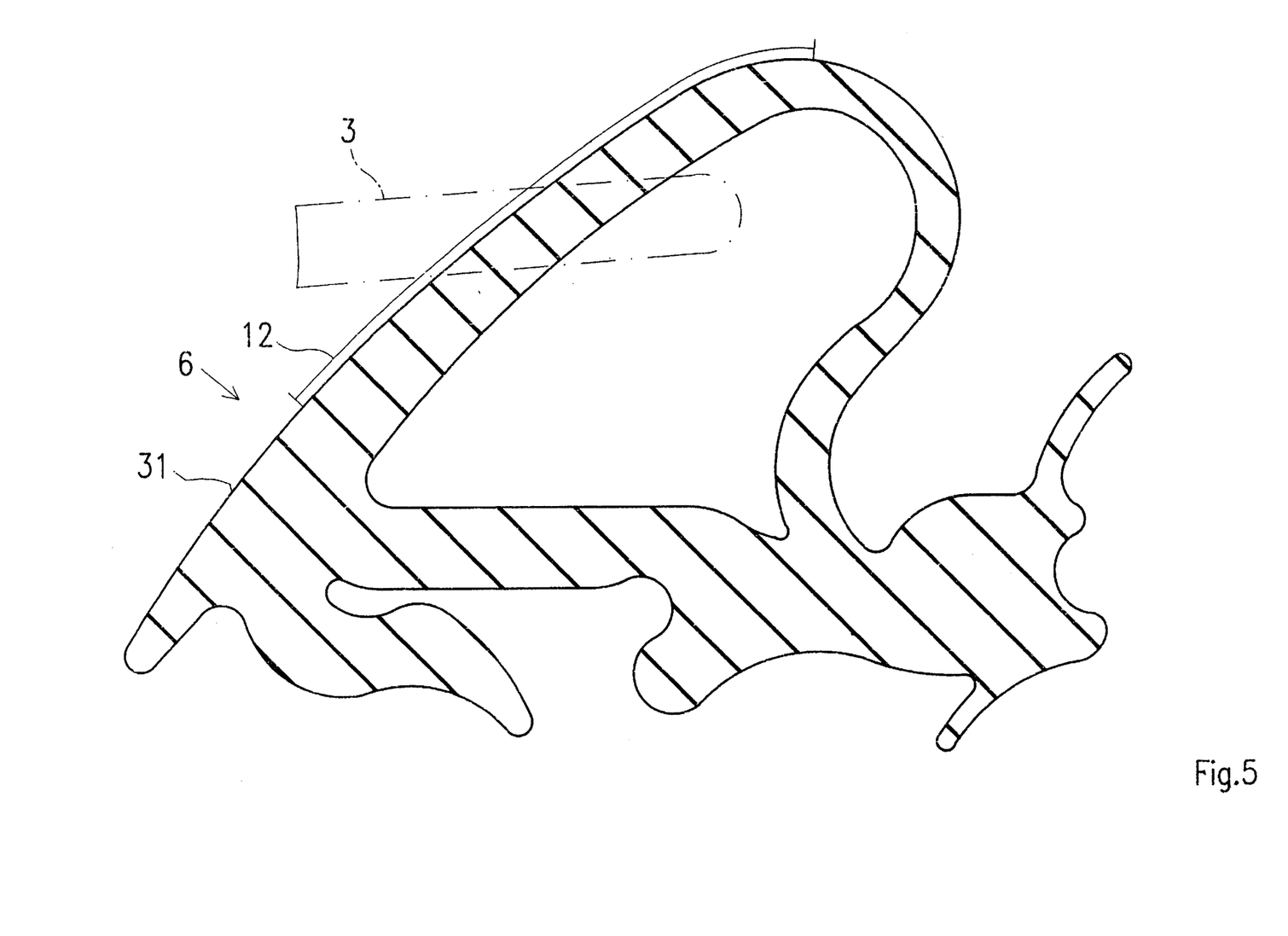
FIG. 5 is the sectional view taken along the line V—V in FIG. 1, on an enlarged scale.

FIG. 5 illustrates the sealing arrangement 6. This consists of a sealing profile 31 of soft rubber which in a manner known per se is held in rails of the B-pillar 5.

Again, the sealing profile 31 carries on a region which comes into sliding contact with the window glass 3 with a cover strip 12 which again in FIG. 5 is shown exaggerated in thickness. The cover strip 12 is provided on its side facing the window glass 3 with the grooves 32 (FIGS. 6 to 8).

A greater or lesser number of oriented grooves 32 could be provided in the surface of the cover strip 12 as is shown in FIGS. 6 to 8. Such grooves 32 can be made in any of various ways.

Preferably, these grooves 32 are each shorter than the cover strip 12. The grooves according to FIG. 6 extend substantially parallel to a lengthwise direction 33 of the cover strip 12.

As shown in FIG. 7 the grooves 32 are arranged transversely to the lengthwise direction 33.

FIG. 8 shows grooves 32 which extend at an angle 34 of less than 90° to the longitudinal direction 33.

FIG. 6 shows also that the cover strip 12 comprises fine fibers 35 of its own material on its grooved side. These fibers 35 can be produced during the manufacture of the grooves 32.

Preferably, the cover strip 12 consists of a high molecular weight polyethylene in all the embodiments mentioned above.

In all the Figures of the drawings the same components are provided with the respective same reference numbers.

Figure 9:
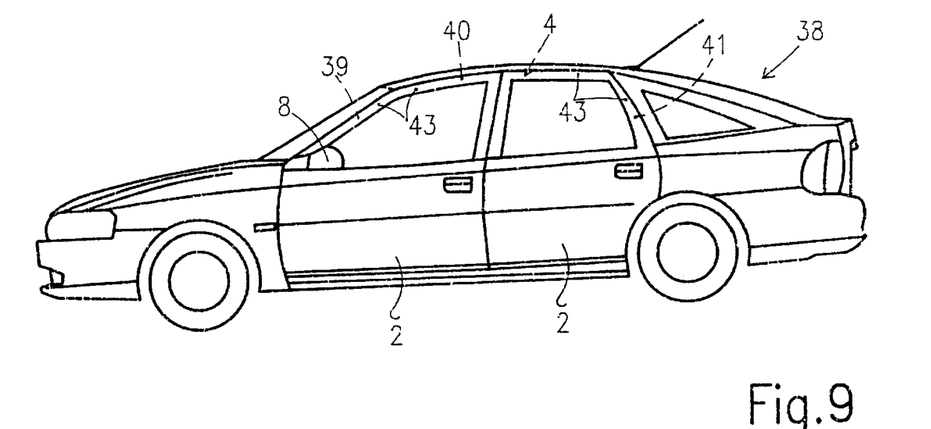
FIG. 9 is the side view of a motor vehicle with sealing profile mounted along a door opening of the body.
Figure 10:
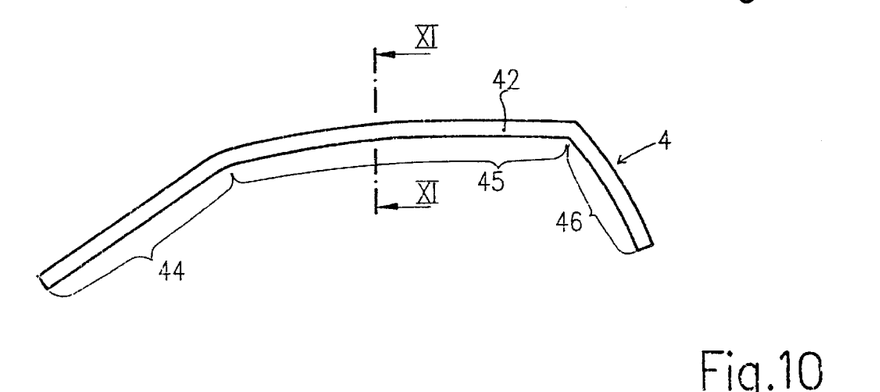
FIG. 10 shows the sealing profile used according to FIG. 9, on an enlarged scale.

FIG. 9 shows a motor vehicle 38 whose A-pillars 39, roof frame 40 and C-pillars 41 are provided on each side of the motor vehicle 38 with a continuous sealing arrangement 4 (FIG. 10). Internal surfaces of window frames 43 of the doors 2, 2 and consisting of enameled sheet metal cooperate sealingly with an outer face 42 (FIGS. 10 and 11) of each sealing arrangement 4 when the doors 3 are closed.

FIG. 10 shows that the sealing arrangement 4 comprises a first section 44 on the A-pillar 39, a second section 45 on the roof frame 40 and a third section 46 on the C-pillar.

Figure 11:
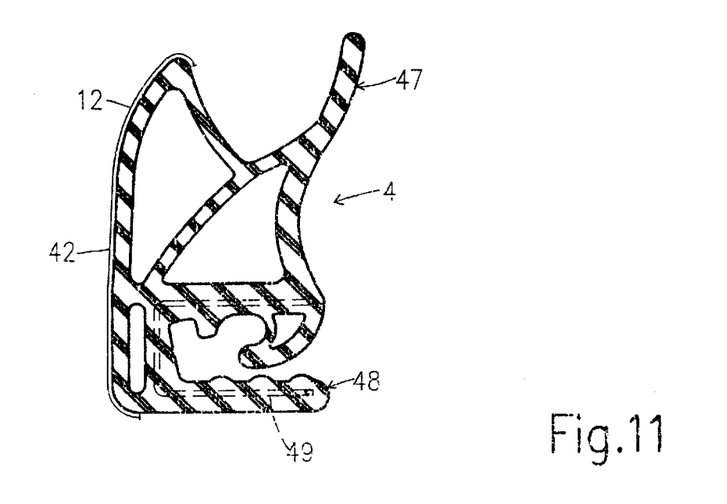
FIG. 11 is the sectional view taken along the line XI—XI in FIG. 10, again on an enlarged scale.

According to FIG. 11, the sealing arrangement comprises a sealing profile 47 whose outer face 42 carries the cover strip 12. The cover strip 12 is again here shown exaggerated in thickness and can be formed in any way and any manner evident herein. One component of the sealing arrangement 4, according to FIG. 11, is a clamping profile 48 which, in a manner known per se, is formed with a U-shaped cross-section and is provided with a metallic reinforcement 49. The sealing arrangement 4 is fitted by means of the clamping profile 48 on a flange of the body which extends along the A-pillar 39, the roof frame 40 and the C-pillar 41.

Figure 12:
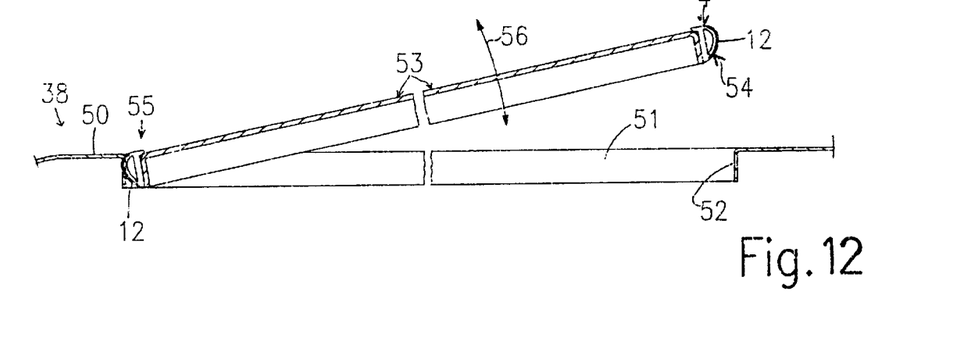
FIG. 12 is a schematic illustration of a pop-up/sliding sunroof.

FIG. 12 shows a section from a roof 50 of the motor vehicle 38. In the roof 50 is formed an aperture 51 whose edge 52 is of enameled sheet metal. The aperture 51 can be closed sealingly, with the aid of the sealing arrangement 4, by a closure member 53 which is formed here as a pop-up/sliding sunroof. The sealing arrangement 4 comprises a sealing profile 54 which is fixed, for example by adhesive, along the periphery of the closure member 53. On its external surface which cooperates with the edge 52 the sealing profile 54 is again provided with the cover strip 12 which is represented in FIG. 12, for simplification only, as a thickened line.

FIG. 12 shows the closure member 53 in the so-called ventilation position, in which a leading edge 55 of the closure member 53 with its part of the peripheral sealing profile 54 stays in sealing contact with the opposing portion of the edge 52. This leading edge 55 represents so to speak a horizontal axis about which the closure member 53 can be pivoted up or down from the closed position or the ventilation position in the directions of a double-headed arrow 56. These pivoting movements can lead to undesirable noise, particularly rattling or squeaking noises in prior art arrangements. This is caused by relative movement between the sealing profile and the edge of the roof aperture. This tendency towards the creation of noise is strongly reduced or even completely eliminated by the provision of the cover strip 12 provided with grooves 32 (FIGS. 6 to 8).

Figure 13:
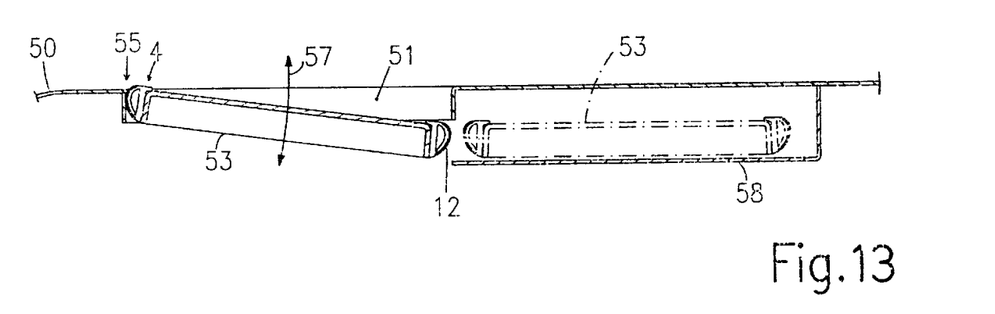
FIG. 13 shows the sunroof of FIG. 12 in other operating positions.

FIG. 13 shows the closure member 53 of FIG. 12 in another operating position. Here, the closure member 53 has been pivoted downwards in the one direction of a double-headed arrow 57 about the leading edge 55, from the ventilation setting shown in FIG. 12 or from the setting in which the aperture 51 is completely closed. Again with this pivoting movement or with the opposite direction pivoting movement corresponding to the other direction of the double-headed arrow 57, this could lead to undesirable noises of the type described above, which again however are curbed by the cover strip 12.

From the lower pivoted position of the closure member 53 which is shown by solid lines in FIG. 13, the closure member 53 can be moved into the setting in a cassette 58 of the roof 50, this position being shown by chain-dotted lines and completely freeing the aperture 51.

Figure 14:
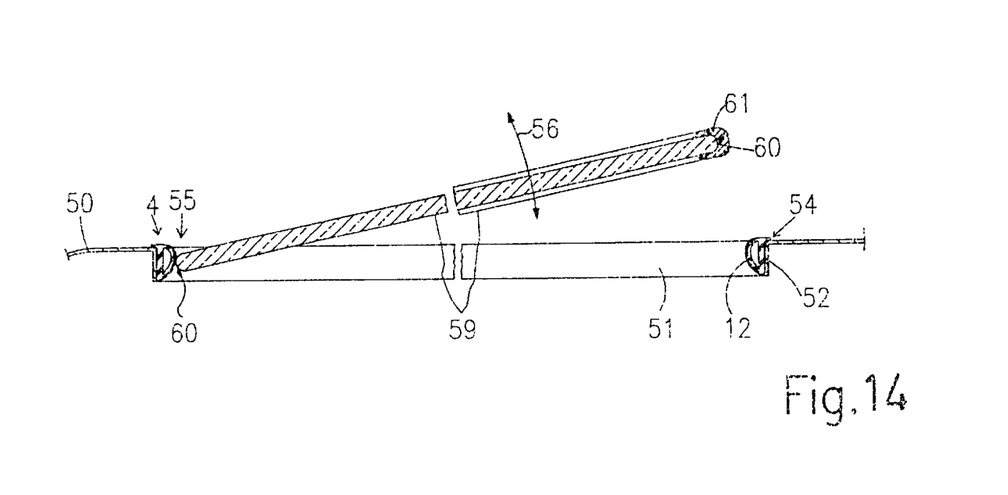
FIG. 14 is a schematic illustration of a moon roof type sunroof of a motor vehicle.

FIG. 14 shows a closure member 59 formed as a moon roof. The closure member 59 can be pivoted and reversed only from the horizontal setting in which the aperture 51 is closed into the ventilation setting shown in FIG. 14, by movement about its leading edge 55 in the directions of the double-headed arrow 56. Two embodiments of closure member 59 are shown simultaneously in FIG. 16. On the left-hand side of FIG. 14 the closure member 59 is shown as a glass window with rounded edge 60. On the right-hand side of FIG. 14 the edge 60 is shown coated with a marginal skirt 61 of polyurethane.

Either the edge 60 or the marginal skirt 61 cooperates sealingly with the sealing profile 54 of the sealing arrangement 4. The sealing profile 54 is in this case fixed, for example by adhesive, to the edge 52 of the aperture 51. On its inner surface which cooperates with the edge 60 or marginal skirt 61, the sealing profile 54 carries the aforementioned cover strip 12 with grooves 32 (FIGS. 6 to 8). Here again, the cover strip 12 has the effect that upon relative movements during the pivoting of the closure member 59, noises are either greatly reduced or, in general, no longer occur.

What is claimed:

1. A seal for sealing a moveable closure member such as a window glass, door or sunroof with respect to an aperture in the body of a motor vehicle by sealingly contacting a surface, said seal comprising:
   a sealing profile;
   a cover strip fixed on said sealing profile and having a side positioned to face said surface, said cover strip formed from a polymer, said polymer consisting essentially of high molecular weight polyethylene; and
   multiple grooves arranged on said side of said cover strip to face said surface, said grooves extending in one direction and are parallel to one another.

2. A seal in accordance with claim 1 wherein said grooves are arranged spaced from one another in said one direction.

3. A seal in accordance with claim 2 wherein said grooves extend parallel to a lengthwise direction of said cover strip.

4. A seal in accordance with claim 2 wherein said grooves extend transversely to a lengthwise direction of said cover strip.

5. A seal in accordance with claim 2 wherein said grooves extend at an angle of less than 90 degrees to a lengthwise direction of said cover strip.

6. A seal in accordance with claim 2 wherein said cover strip comprises fine fibers on said side, said fibers comprising a material the same as that of said cover strip.

7. A seal in accordance with claim 1 wherein said grooves extend parallel to a lengthwise direction of said cover strip.

8. A seal in accordance with claim 1 wherein said grooves extend transversely to a lengthwise direction of said cover strip.

9. A seal in accordance with claim 1 wherein said grooves extend at an angle of less than 90 degrees to a lengthwise direction of said cover strip.

10. A seal in accordance with claim 1 wherein said cover strip comprises fine fibers on said side, said fibers comprising a material the same as that of said cover strip.

11. A seal for sealing a window glass moveable in an aperture of a motor vehicle door, said seal comprising:
- a sealing profile securable to the door and having a region arranged to sealingly engage said window glass when secured to said door;
- a cover strip fixed on said region of said sealing profile and having a side positioned to contact said window glass when said window glass sealingly engages said region, said cover strip formed from a polymer, said polymer consisting essentially of high molecular weight polyethylene; and
- multiple grooves arranged on said side of said cover strip, said grooves extending in one direction and are parallel to one another.

12. A seal in accordance with claim 11 wherein said grooves are arranged spaced from one another in said direction.

13. A seal in accordance with claim 11 wherein said grooves extend parallel to a lengthwise direction of said cover strip.

14. A seal in accordance with claim 11 wherein said grooves extend transversely to a lengthwise direction of said cover strip.

15. A seal in accordance with claim 11 wherein said grooves extend at an angle of less than 90 degrees to a lengthwise direction of said cover strip.

16. A seal in accordance with claim 11 wherein said cover strip comprises fine fibers on said side, said fibers comprising a material the same as that of said cover strip.

17. A seal for sealing a closure member with respect to an aperture in the body of a motor vehicle where the closure member is movable relative to an edge of the aperture, said seal comprised:
- a sealing profile securable to said edge and capable of sealingly engaging a surface of said closure member;
- a cover strip fixed to said sealing profile and having a side arranged to contact said surface, said cover strip formed from a polymer, said polymer consisting essentially of high molecular weight polyethylene; and
- multiple grooves arranged on a side of said cover strip to face said edge of the aperture, said grooves extending in one direction and are parallel to one another.

18. A seal in accordance with claim 17 wherein said grooves are arranged spaced from one another in said direction.

19. A seal in accordance with claim 17 wherein said grooves extend parallel to a lengthwise direction of said cover strip.

20. A seal in accordance with claim 17 wherein said grooves extend transversely to a lengthwise direction of said cover strip.

21. A seal in accordance with claim 17 wherein said grooves extend at an angle of less than 90 degrees to a lengthwise direction of said cover strip.

22. A seal in accordance with claim 17 wherein said cover strip comprises fine fibers on said side, said fibers comprising a material the same as that of said cover strip.

23. A seal arrangement comprising in combination:
- a movable closure member for an aperture in the body of a motor vehicle; and
- a seal for sealing said movable closure member by sealingly contacting a surface thereof, said seal comprising a sealing profile; a cover strip fixed on said sealing profile and having a side positioned to face said surface, said cover strip formed from a polymer, said polymer consisting essentially of high molecular weight polyethylene; and multiple grooves arranged on said side of said cover strip facing said surface, said grooves extending in one direction parallel to one another;
- wherein said seal is secured to said closure member by sealingly contacting said closure member surface, thereby sealing said closure member with respect to said aperture.

* * * * *